March 3, 1936.  G. D. SECKINGER  2,032,636
OUTLET BOX HANGER
Filed Oct. 23, 1933  2 Sheets-Sheet 1

G. D. Seckinger Inventor

By C. A. Snow & Co.
Attorneys.

March 3, 1936.                    G. D. SECKINGER                    2,032,636
                              OUTLET BOX HANGER
                            Filed Oct. 23, 1933                 2 Sheets-Sheet 2
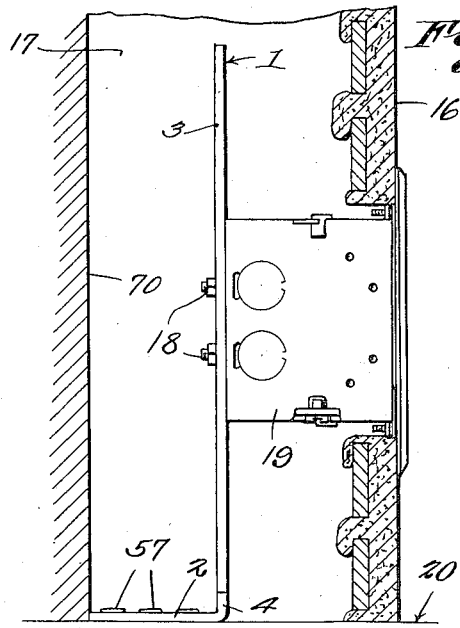
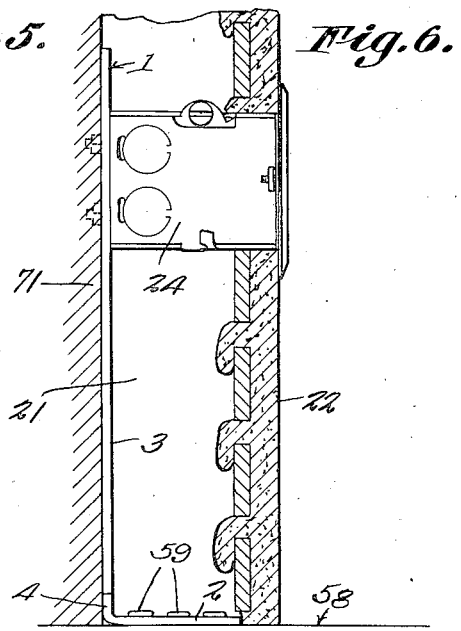
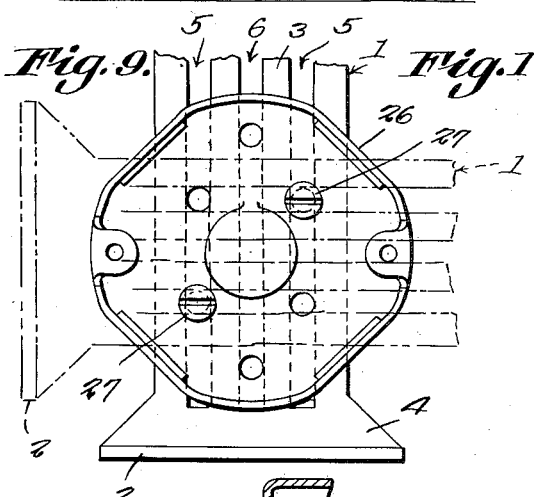
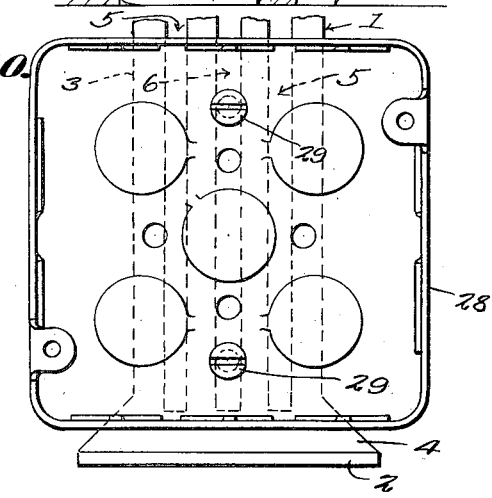
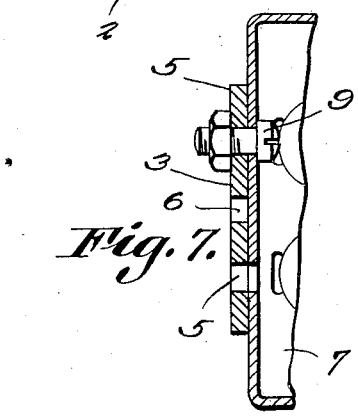
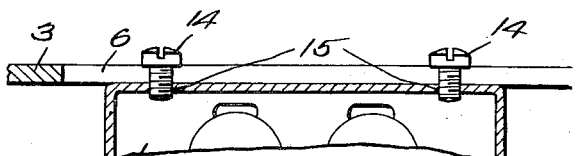
G. D. Seckinger Inventor
By C. A. Snow & Co.
Attorneys.

Patented Mar. 3, 1936

2,032,636

UNITED STATES PATENT OFFICE 2,032,636

OUTLET BOX HANGER

George D. Seckinger, Mansfield, Pa.

Application October 23, 1933, Serial No. 694,852

2 Claims. (Cl. 247—21)

By way of explanation, it may be stated that the locating of an outlet box of the kind used by electricians is a somewhat difficult task, either on new work or on old work. The location of the box presupposes that the carpenter will provide a proper support for it. Sometimes the support is not properly located on new work, and it very often has to be provided on old work. There are problems such as placing the box in a level and in a symmetrical position, in properly spaced relation horizontally, to the frame of a door, and the like.

The foregoing being understood, it may be stated that the object of the present invention is to provide a simple bracket whereby an outlet box may be located properly under almost all of the conditions that can be met with in actual practice, the bracket being adapted to the use of practically every outlet box now found on the market.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 5 is a sectional view showing one way in which the bracket may be used with respect to the studding or the like, and the plastering;

Fig. 6 is a sectional view showing an application of the invention differing slightly from that shown in Fig. 5;

Fig. 7 is a section on the line 7—7 of Fig. 1;

Fig. 8 is a section on the line 8—8 of Fig. 3;

Fig. 9 is an elevation showing the bracket assembled with a different form of junction box;

Fig. 10 is an elevation showing a still different junction box mounted on the bracket.

Figure 4:
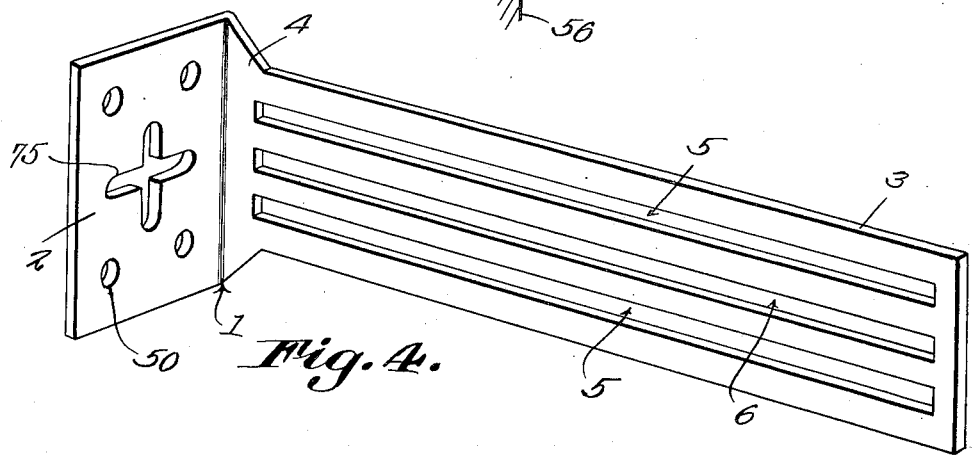
Fig. 4 is a perspective view of the bracket.

In carrying out the invention, there is provided a metal bracket 1, shown in detail in Fig. 4. The bracket 1 comprises a base 2 and an arm 3 at right angles to the base, the base and the arm being joined together by a tapered reenforcing portion 4. There are holes 50 in the base 2, and these holes are arranged in the form of a rectangle, or otherwise, about a cruciform opening 75 in the base. The holes 50 and the opening 75 being adapted to receive the securing elements by which the base 2 is connected to the rigid part of the building which carries the bracket. In the arm 3 there are a plurality of longitudinal slots 5 and 6, extended practically the entire length of the arm, the outside slots being designated by the numeral 5, and the intermediate slot being designated by the numeral 6.

Figure 1:
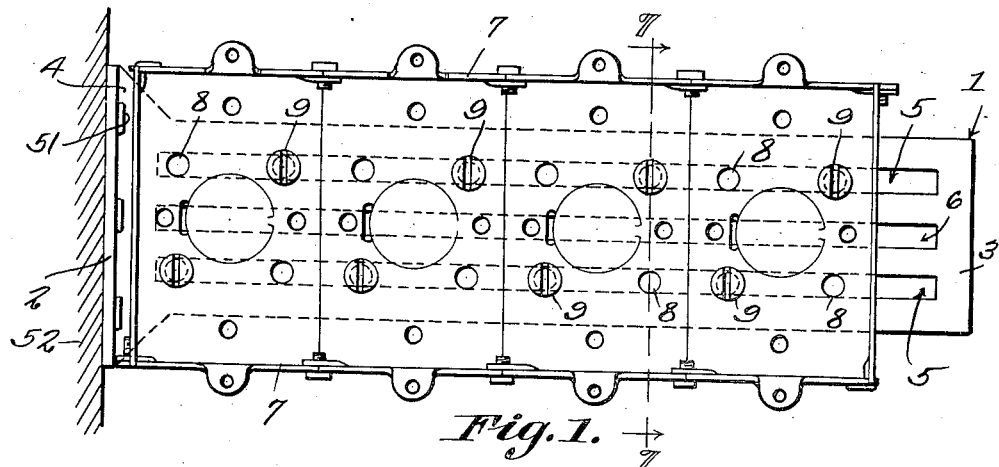
Fig. 1 shows in elevation, a device constructed in accordance with the invention, the article carrying a gang of outlet boxes.

One way of using the device is shown in Fig. 1 of the drawings. In that figure there is disclosed a gang of boxes 7 having holes 8 in their bases. These holes may or may not be threaded, and they are used to attach fixtures to the box, to attach the cable brackets, or to attach the box, in the ordinary procedure, to the wooden part that carries it. In any event, some of these openings or holes 8 are always available to connect the box to the bracket. In Figs. 1 and 7, securing elements 9, such as bolts, are inserted into certain of the holes 8, and are mounted in the outside slots 5 of the arm 3 of the bracket 1. The base 2 of the bracket is attached by securing elements 51, passing through the holes 50 and the cruciform opening 75, to any vertical support 52 which may be available in the building. It will be obvious, from an inspection of Fig. 1, that the gang of outlet boxes 7 may be adjusted longitudinally of the arm 3 of the bracket 1, as occasion may demand, the securing elements or bolts 9 moving, accordingly, in the slots 5. After the necessary adjustment has been effected, the bolts 9 of course may be tightened up. By putting a screw, nail or the like, through the center of the cross-shaped opening 75, into the support 52, the person installing the box can shift it to an adjusted position, which can be made permanent by mounting additional securing elements in the holes 50.

Figure 2:
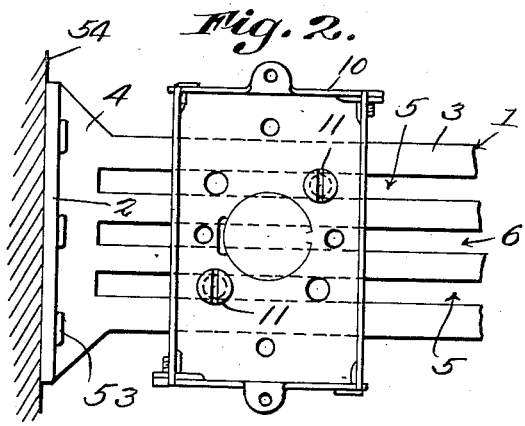
Fig. 2 is an elevation wherein the box is shown placed crosswise of the bracket.

In Fig. 2, a single outlet box 10 is shown and is attached by securing elements 11 to the arm 3 of the bracket 1, the securing elements 11 being received in the outer slots 5 of the arm 3. The box 10 is disposed crosswise of the arm 3 of the bracket 1. The base 2 of the bracket is attached by securing elements 53 to a vertical support 54. In Fig. 2, as in Fig. 1, the box 10 can be adjusted lengthwise of the arm 3 of the bracket 1, as occasion may demand.

Figure 3:
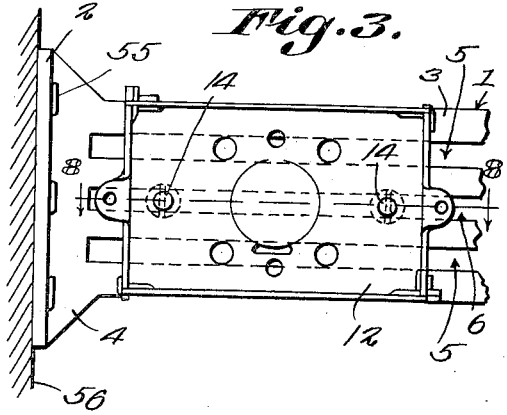
Fig. 3 is an elevation wherein the box is shown placed lengthwise of the bracket.

In Fig. 3, a single box 12 is disposed lengthwise of the arm 3 of the bracket 1, instead of crosswise of the bracket as in Fig. 2. The box 12 is attached to the arm 3 of the bracket 1 by means of securing elements 14, located in holes adjacent to the longitudinal center of the box, and these securing elements may be screws, as shown in Fig. 8, threaded into the holes 15 in the base of the box. The part 2 of the bracket is attached by securing members 55 to a vertical support 56. The box 12, obviously, can be adjusted lengthwise of the arm 3 of the bracket 1, the threaded securing elements 14 being disposed in the intermediate slot 6 of the arm 3 of the bracket.

In Fig. 5, the wall or plastering of a building is shown at 16, and the numeral 17 designates a support, such as a studding. If the member 17 happens to be a 2 x 4, placed edgewise with respect to the wall 16, then there will be a considerable space between the wall 16 and the part 70 that is behind the studding. Under such circumstances, the base 2 of the bracket 1 is disposed toward the part 70, and is held on any horizontal member or the building, marked by the numeral 20, by screws or the like, shown at 57. The box 19 is held on the arm 3 by securing elements 18, and may be adjusted vertically so that it will cooperate properly with the opening in the wall 16.

In Fig. 6, the studding or the like is marked by the numeral 21, and the space between the wall 22 and the part 71 that is behind the studding is less than the corresponding distance in Fig. 5. Under such circumstances, the base 2 of the bracket 1 projects toward the wall 22 and is attached to any accessible horizontal portion 58 of the building by securing elements 59. The box 24 is held in the slots of the arm 3 of the bracket by securing elements, as hereinbefore described, and is vertically adjustable.

In Fig. 9, a substantially octagonal box 26 is held on the arm 3 of the bracket 1 by securing elements 27, and Fig. 9 shows that the bracket may be placed either vertically or horizontally. If the bracket is placed horizontally, the box 26 can be adjusted horizontally, and if the bracket is placed vertically, the box can be adjusted vertically.

In Fig. 10, a square box is shown and is marked by the numeral 28, the box 28 being held on the bracket by securing elements 29, located adjacent to the central line of the box, and cooperating with the slot 6 in the arm 3 of the bracket 1.

From the foregoing, it will be noted that the bracket is capable of being used under a wide variety of conditions. The structure of the building seldom is found in such condition that the box cannot be mounted properly by the use of the bracket, the box setting squarely in the wall, and it being possible to attach the face plate box in such a position that a neat appearing job will result. Since the box can be adjusted longitudinally of the bracket, the box can be located wherever desired, within the limit of the length of the arm 3 of the bracket.

In general, the advantages of the invention may be summed up in the statement that the bracket can always be placed properly, carry the box, and the box can be mounted on the bracket for adjustment in a wide variety of ways, it being possible to accommodate practically any outlet box now on the market.

Having thus described the invention, what is claimed is:

1. A supporting bracket for boxes used in electrical work, comprising a base having holes, for the reception of securing elements, and an arm extending from one edge of the base and disposed approximately at right angles to the base, said arm being provided with a plurality of relatively narrow parallel longitudinal slots for the reception of the attaching elements that hold boxes on the arm, the arm being long enough to accommodate a plurality of boxes, and the slots being long enough to permit the adjustment of a plurality of boxes longitudinally of the arm, the slots defining longitudinal bars in the arm, the width of the bars approximating the width of the slots, thereby to bring the slots close together and to give an extended range of registration between the slots and the openings that receive the attaching elements for boxes of widely different hole-constructions, and thereby so to construct the arm that it will not cover the cable clamp holes of the boxes.

2. A supporting bracket for boxes used in electrical work, constructed as set forth in claim 1, and further characterized by a cruciform hole for a securing element, located in the base among the first-specified holes, said hole providing means whereby the bracket can be initially secured and subsequently adjusted to properly position the box.

GEORGE D. SECKINGER.